United States Patent Office 3,507,882
Patented Apr. 21, 1970

3,507,882
SUBSTITUTED 1,3-DIHYDRO-2,1,4-BENZO-THIADIAZEPINE-2,2-DIOXIDES
Otto Hromatka, Maximilian Knollmüller and Dieter Binder, Vienna, Austria, assignors to Smith Kline & French Laboratories, Philadelphia, Pa., a corporation of Pennsylvania
No Drawing. Filed Oct. 5, 1967, Ser. No. 672,970
Int. Cl. C07d 99/00
U.S. Cl. 260—327                4 Claims

ABSTRACT OF THE DISCLOSURE 5-phenyl-1,3-dihydro - 2,1,4 - benzothiadiazepine - 2,2-dioxides prepared by ring closure of a 2-chloromethylsulfonamidobenzophenone-β-oxime have tranquilizing activity. The benzo ring may be chloro or trifluoromethyl substituted, the 1-nitrogen atom may be alkylated and the 4-nitrogen atom may be an N-oxide or form a 4,5-epoxy linkage.

---

This invention relates to novel 1,3-dihydro-2,1,4-benzothiadiazepine-2,2-dioxides which have useful pharmacodynamic activity. More specifically the compounds of this invention have tranquilizing activity as demonstrated in standard laboratory animals. For example, central nervous system depression, such as decreased motor activity, is observed in rats after oral administration of doses of 200 mg./kg. At these doses no toxicity is observed.

The 1,3 - dihydro-2,1,4-benzothiadiazepine-2,2-dioxides of this invention are represented by the following general structural formula:

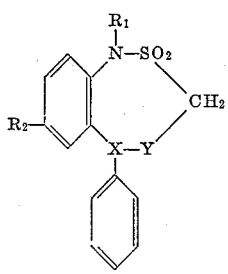

FORMULA I wherein:
$R_1$ represents hydrogen or lower alkyl having from 1 to 4 carbon atoms;
$R_2$ represents hydrogen, chlorine or trifluoromethyl; and

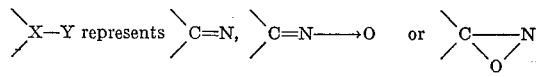

Preferred compounds of this invention having tranquilizing activity are represented by Formula I above when $R_1$ represents hydrogen or methyl and $R_2$ represents chlorine.

The compounds of this invention may be used in the form of a pharmaceutically acceptable acid addition salt having the utility of the free base. Such salts are formed from both organic and inorganic acids, for example: maleic, fumaric, benzoic, ascorbic, pamoic, succinic, bis-methylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of Formula I are prepared according to the following method:

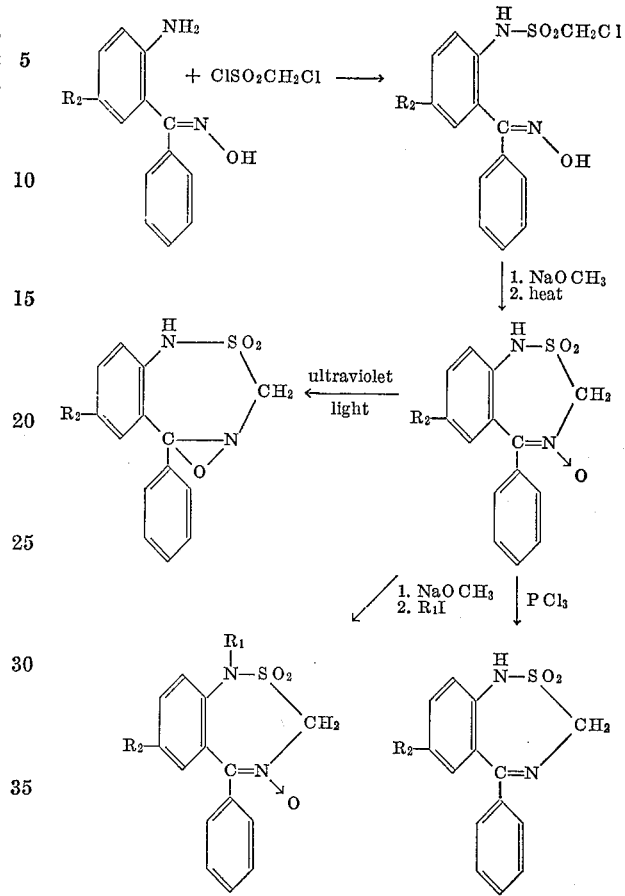

Thus the known 2-aminobenzophenone-β-oxime is reacted with chloromethylsulfonyl chloride in pyridine at low temperature to give the 2-chloromethylsulfonamido-benzophenone-β-oxime. The latter is cyclized by evaporating to dryness a solution of the oxime in a two-fold molar amount of methanolic sodium methoxide and heating the residue in dioxane to give the 5-phenyl-1,3-dihydro-2,1,4-benzothiadiazepine-2,2,4-trioxide. Irradiation of the N-oxide with ultraviolet light results in the 4,5-epoxy derivative. Reduction of the N-oxide with for example phosphorus trichloride in chloroform yields the corresponding reduced thiadiazepine. Alkylation of the N-oxide by treating the sodium salt with an alkyl iodide gives the 1-nitrogen atom substituted derivatives which may be similarly irradiated with ultraviolet light or reduced with phosphorus trichloride to give the corresponding 4,5-epoxy or reduced products, respectively.

The compounds of this invention may be administered orally or parenterally in conventional dosage unit forms such as tablets, capsules, injectables or the like, by incorporating the appropriate dose of a compound of Formula I or an appropriate salt thereof with carriers according to accepted pharmaceutical practice. In view of the structural relationship and similar utility of the compounds of this invention to the well-known benzodiazepine series of pharmacological agents, further details of their use will be obvious to those skilled in the art.

The foregoing is a general description of how to prepare and use the compounds of this invention. The following examples illustrate the preparation of specific compounds having tranquilizing activity. However, this should not be construed as limiting the scope of the invention 3,507,882

3 since appropriate variations in the reactants will produce other corresponding products set forth in Formula I.

EXAMPLE 1

To 90.1 g. of 5-chloro-2-aminobenzophenone-β-oxime in 500 ml. of water-free pyridine, at −6° C., is added 57.0 g. of chloromethylsulfonyl chloride over a 50 minute period. After standing for one hour the reaction mixture is concentrated at reduced pressure and treated with ether and dilute hydrochloric acid solution. The ether solution is extracted with dilute sodium hydroxide solution and the alkaline solution neutralized to give 5-chloro-2-chloromethylsulfonamidobenzophenone - β - oxime, M.P. 142–145° C.

A solution of 61.0 g. of the oxime thus prepared in 356.5 ml. of 1 N methanolic sodium methoxide solution is evaporated to dryness at reduced pressure and the residue in 1100 ml. of dioxane is heated for 30 minutes on a water bath, with frequent shaking. The resulting solution is evaporated at reduced pressure, taken up in water and acidified to yield 5-phenyl-7-chloro-1,3-dihydro-2,1,4-benzothiadiazepine-2,2,4-trioxide, M.P. 209–212° C.

Similarly there is prepared 5-phenyl-1,3-dihydro-2,1,4-benzothiadiazepine - 2,2,4 - trioxide and 5-phenyl-7-trifluoromethyl - 1,3 - dihydro-2,1,4-benzothiadiazepine-2,2,4-trioxide.

EXAMPLE 2

A solution of 2.0 g. of 5-phenyl-7-chloro-1,3-dihydro-2,1,4-benzothiadiazepine-2,2,4-trioxide in 500 ml. of ethanol is irradiated with ultraviolet light for five days. Evaporation as reduced pressure furnishes the 4,5-epoxy-5-phenyl-7-chloro - 1,3,4,5 - tetrahydro - 2,1,4 - benzothiadiazepine-2,2-dioxide, M.P. 170° C. (decomp.).

EXAMPLE 3

A mixture of 1.0 g. of 5-phenyl-7-chloro-1,3-dihydro-2,1,4 - benzothiadiazepine-2,2,4-trioxide and 1.5 ml. of phosphorus trichloride in 20 ml. of absolute chloroform is heated under reflux for 30 minutes. After cooling, the precipitate is filtered and dissolved in 0.5 N sodium hydroxide solution. Neutralization with 2 N hydrochloric acid solution yields 5-phenyl-7-chloro-1,3-dihydro - 2,1,4-benzothiadiazepine-2,2-dioxide, M.P. 178–180° C.

EXAMPLE 4

To 48.8 ml. of 1 N methanolic sodium methoxide solution is added 15.0 g. of 5-phenyl-7-chloro-1,3-dihydro-2,1,4-benzothiadiazepine-2,2,4-trioxide, the mixture is evaporated to dryness at reduced pressure and the residue is dissolved in dimethylformamide. The latter solution is treated with 7 ml. methyl iodide, allowed to stand for 75 minutes and evaporated at reduced pressure. Treatment with dilute sodium hydroxide solution and ether furnishes the 1-methyl-5-phenyl-7-chloro - 1,3 - dihydro - 2,1,4-benzothiadiazepine-2,2,4 - trioxide, M. P. 183–186° C. (decomp.).

EXAMPLE 5

A mixture of 7.0 g. of 1-methyl-5-phenyl-7-chloro-1,3-dihydro-2,1,4-benzothiadiazepine-2,2,4-trioxide and 10.5

4 ml. of phosphorus trichloride in 200 ml. of absolute chloroform is heated under reflux for 40 minutes. The reaction mixture is poured into 310 ml. of ice-cold 2 N sodium hydroxide solution and the dried chloroform solution evaporated to give 1-methyl-5-phenyl-7-chloro - 1,3 - dihydro - 2,1,4-benzothiadiazepine-2,2-dioxide, M.P. 173–175° C.

EXAMPLE 6

Exemplary of the tranquilizing activity demonstrated by the compounds of this invention are the results obtained with 1-methyl-5-phenyl-7-chloro-1,3-dihydro - 2,1,4-benzothiadiazepine-2,2,4-trioxide. Oral administration of this compound to rats at doses of 200 mg./kg. produced central nervous depression as indicated by decreased motor activity, hypotonia and miosis. No toxicity was observed at these doses.

What is claimed is:

1. A chemical compound or a pharmaceutically acceptable acid addition salt thereof, said compound having the formula:

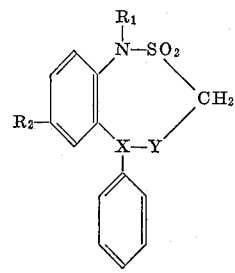

in which:

$R_1$ is hydrogen or lower alkyl having from 1 to 4 carbon atoms;

$R_2$ is hydrogen, chlorine or trifluoromethyl; and

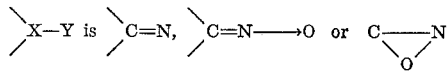

2. A chemical compound according to claim 1 in which $R_1$ is hydrogen or methyl and $R_2$ is chlorine.

3. A chemical compounds according to claim 2 in which $R_1$ is hydrogen and $>$X$=$Y is $>$C$=$N$\to$O, being the compound 5-phenyl-7-chloro-1,3-dihydro - 2,1,4 - benzothiadiazepine-2,2,4-trioxide.

4. A chemical compound according to claim 2 in which $R_1$ is methyl and $>$X$=$Y is $>$C$=$N$\to$O, being the compound 1-methyl-5-phenyl-7chloro - 1,3 - dihydro - 2,1,4-benzothiadiazepine-2,2,4-trioxide.

References Cited

UNITED STATES PATENTS 3,377,357    4/1968    Traverso _____ 260—327

JAMES A. PATTEN, Primary Examiner

U.S. Cl. X.R.

204—158; 260—556, 999